US010614051B2

(12) United States Patent
Walbroel (10) Patent No.: US 10,614,051 B2
(45) Date of Patent: Apr. 7, 2020

(54) METHOD FOR OPERATING AN ENGINEERING SYSTEM FOR AN INDUSTRIAL PROCESS AUTOMATION SYSTEM, AND CONTROL PROGRAM

(71) Applicant: Siemens Aktiengesellschaft, Munich (DE)

(72) Inventor: Stefan Walbroel, Wesseling (DE)

(73) Assignee: Siemens Aktiengesellschaft, Munich (DE)

( * ) Notice: Subject to any disclaimer, the term of this patent is extended or adjusted under 35 U.S.C. 154(b) by 220 days.

(21) Appl. No.: 15/899,778

(22) Filed: Feb. 20, 2018

(65) Prior Publication Data

US 2018/0239323 A1 Aug. 23, 2018

(30) Foreign Application Priority Data

Feb. 21, 2017 (EP) .................................... 17157080

(51) Int. Cl.
*G06F 16/22* (2019.01)
*G05B 19/042* (2006.01)

(52) U.S. Cl.
CPC ..... *G06F 16/2291* (2019.01); *G05B 19/0426* (2013.01); *G05B 2219/13101* (2013.01);
(Continued)

(58) Field of Classification Search
CPC ............ G06F 16/2291; G05B 19/0426; G05B 2219/23255; G05B 2219/13101; G05B 2219/23126; G05B 19/41835
See application file for complete search history.

(56) References Cited

U.S. PATENT DOCUMENTS 6,063,128 A 5/2000 Bentley et al.
8,635,305 B1 * 1/2014 Subramaniam ..... G06F 16/9574
709/219
(Continued)

FOREIGN PATENT DOCUMENTS

DE 102012209141 12/2013
EP 1166215 1/2002
(Continued)

OTHER PUBLICATIONS

English Translation of European Search Report dated Jul. 27, 2017.

*Primary Examiner* — Albert M Phillips, III
(74) *Attorney, Agent, or Firm* — Cozen O'Connor (57) ABSTRACT

An engineering system for an industrial process automation system, wherein objects predefined by a user selection are loaded for processing from a database into at least one processing memory area, where upon initiation of a user release of objects to be released that have been loaded into a selected processing memory area, a check is performed to establish whether a processing memory area directly of higher priority is present, direct predecessors in the processing memory area of higher priority are determined for releasable objects that have been loaded into the selected processing memory area and added to the releasable objects upon a positive result, objects hierarchically subordinate to objects among the releasable objects to be released are determined and tagged for release, and where objects tagged for release, via a change of their assignment, are shifted from the selected user memory area into the user memory area of higher priority.

16 Claims, 4 Drawing Sheets

(52) U.S. Cl.
CPC ........... *G05B 2219/23126* (2013.01); *G05B 2219/23255* (2013.01)

(56) References Cited

U.S. PATENT DOCUMENTS

| | | | | |
|---|---|---|---|---|
| 2003/0220952 | A1* | 11/2003 | Borman | G06F 12/0253 |
| 2010/0241675 | A1* | 9/2010 | Young | G06F 9/4488 |
| | | | | 707/815 |
| 2011/0010454 | A1* | 1/2011 | Anuff | G06Q 10/10 |
| | | | | 709/225 |

FOREIGN PATENT DOCUMENTS

| | | |
|---|---|---|
| EP | 2808749 | 5/2013 |
| WO | WO2010037145 | 4/2010 |
| WO | WO2016023573 | 2/2016 |

* cited by examiner

METHOD FOR OPERATING AN ENGINEERING SYSTEM FOR AN INDUSTRIAL PROCESS AUTOMATION SYSTEM, AND CONTROL PROGRAM

BACKGROUND OF THE INVENTION

1. Field of the Invention

The invention relates to a control program and to a method for operating an engineering system for an industrial process automation system.

2. Description of the Related Art

Industrial automation systems serve for the monitoring, control and regulation of technical processes, in particular in the field of manufacturing, process and building automation, and enable substantially independent operation of control devices, sensors, machines and technical installations. An essential basis for a reliable provision of monitoring, control and regulation functions via a process automation system consists in a complete and correct acquisition and imaging of components of the industrial process automation system in an engineering or project planning system.

With an engineering system, it is possible to perform project planning in particular of control programs for automation devices that are provided for the visualization of an image of a technical installation or of a complex machine and the control and/or regulation thereof. At the run-time of the control programs or during run-time operation, a technical process is controlled and/or regulated by automation devices, such as programmable logic controllers. In the context of process monitoring during run-time operation, an operator can call up process images in order to obtain an overview of a current installation state and to perceive a process implementation or operational control.

EP 1 166 215 B1 describes a method for the automatic retrieval of engineering data from technical installations, where engineering and run-time objects are described by a uniform object model. This allows a direct correspondence between engineering objects and run-time objects to be defined at the object level, such that no loss of information arises as a result of a mapping of installation components onto the object model. Moreover, a direct communication between engineering and run-time objects can take place.

EP 2 808 749 B1 discloses a method for the exchange of control information between operating and observation devices of an industrial automation system. Based on the control information, an image (at least in segments) of a technical installation regulated or controlled via automation devices is visualized on a graphical user interface of a respective operating and observation device. Computer-based objects that represent elements of the technical installation and that are provided by a run-time environment set up on a respective operating and observation device are assigned to the visualized image. All object types provided on different operating and observation devices are made available for cross-device access in accordance with a uniform addressing scheme.

U.S. Pat. No. 6,063,128 relates to a system comprising a storage device, a first and second hardware or software platform, a persistent portable data model and computer-based modeling systems, which are dependent on the first and second platforms. Each platform has an interface to the storage device and provides system-dependent services. A first type of operating system and a first type of computer hardware are assigned to the first platform, while a second type of operating system and a second type of computer hardware are assigned to the second platform. The portable data model is stored in the storage device in a platform-independent format and comprises persistent component objects. Furthermore, the computer-based modeling system for the first platform is stored in a first memory area of the storage device, while the computer-based modeling system for the second platform is stored in a second memory area of the storage device. Each computer-based modeling system provides services for retrieving the portable data model from the storage device, for changing the data model by adding and removing component objects, and for storing the data model in persistent fashion in the storage device. Moreover, each computer-based modeling system comprises a static kernel and a dynamic software framework. The kernels run on the respective platform and form interfaces to the assigned operating system and to the corresponding computer hardware. The software frameworks run on the respective platform, form interfaces to the assigned kernel and provide a respective platform-independent graphical user interface.

WO 2010/037145 A2 discloses a method for process control management in a computer system that is provided for configuring and monitoring a process installation. The computer system provides an interactive user interface for managing a plurality of objects in the process installation. Here, each object of the plurality of objects corresponds to a physical or logical unit in the process installation. In addition, a navigation area for displaying a set of selectable elements is created. Each element in the set of selectable elements corresponds to a respective object from the plurality of objects. Furthermore, a command area for representing a set of selectable control elements is created. Each control element from the set of selectable control elements corresponds to a task to be performed on at least one object of the plurality of objects in the process installation. A selection of one element from the set of selectable elements is received by the navigation area, while a selection of one control element from the set of selectable control elements is received via the command area. An operational context is determined based on the received selection. The operational contact corresponds to a set of actions applicable to the selection if the selection is an element selection, or to a set of elements to which the selection is applicable if the selection is a control element selection. The navigation area or the command area is adapted in accordance with the operational context.

Previous engineering software solutions (COMOS from Siemens) comprise virtual areas referred to as working layers, which enable processing of engineering data in a productive environment without changes in engineering data in a working layer directly bringing about changes in operatively used productive data. A working layer comprises only actually changed entities of existing engineering data, but not a copy of all productive data. Engineering data that have been changed in a working layer can be accepted in a superordinate working layer or in the productive data in the context of a release. In this case, engineering objects are released separately with hierarchical dependencies being taken into account on the client side and a multiplicity of update requests are communicated to database servers. Comprehensive release processes are therefore very time-consuming and engender high communication network loads.

SUMMARY OF THE INVENTION

It is an object of the present invention to provide a control program and an efficient method for operating an engineering system for an industrial process automation system that enables a considerable acceleration of release processes for changed engineering data.

This and other objects and advantages are achieved in accordance with the invention by a control program and a method for operating an engineering system for an industrial process automation system, where components of the industrial process automation system are each represented by a computer-based object within the engineering system and stored in a persistent manner in at least one server-side database of the engineering system. The objects are managed on the server side within a hierarchical object structure with a plurality of hierarchical levels. Here, the object structure comprises dependencies between objects. Objects predefined by a user selection are loaded for a processing from the database into at least one processing memory area. Here, a respective access-authorized user is assigned to the objects and to the processing memory area. Access-authorized users assigned to objects and/or processing memory areas can be, for example, owners of the respective object or processing memory area. A first processing memory area, which is assigned as access-authorized user to a second processing memory area, is hierarchically of higher priority with respect to the second processing memory area. A first object in a processing memory area of higher priority, where the first object has an identical object identifier to a second object in a processing memory area of lower priority, is a predecessor of the second object.

In accordance with the invention, upon initiation of a client-side user release of objects to be released that have been loaded into a selected processing memory area, a check is made to establish whether a processing memory area that is directly of higher priority is assigned to the selected processing memory area. Preferably, for the selected processing memory area, upon initiation of the client-side user release, processing memory areas of higher priority are determined recursively. The objects to be released that have been loaded into the selected processing memory area are written back to the server-side database in the event of a negative result of the check. By contrast, for releasable objects that have been loaded into the selected processing memory area, in the event of a positive result of the check, direct predecessors of the releasable objects in the processing memory area of higher priority are preferably recursively determined, which have access-authorized users corresponding to those of the releasable objects. The determined predecessors are then added to the releasable objects. Among the releasable objects, the objects to be released are tagged for release in accordance with user input.

In accordance with the invention, moreover, among the releasable objects, objects subordinate to the objects to be released within the hierarchical object structure are determined, preferably recursively, and tagged for release. Objects tagged for release are subsequently deleted from the user memory area of higher priority. The objects tagged for release, via a change of their assignment, are shifted from the selected user memory area into the user memory area of higher priority for a conclusion of the client-side user release. Successors of objects released by a client-side user release in user memory areas of lower priority can be replaced for example in accordance with the client-side user release.

Advantageously, in particular, the objects tagged for release can be deleted from the user memory area of higher priority via a single database operation. In a corresponding manner, the objects tagged for release can be shifted from the selected user memory area into the user memory area of higher priority via a single database operation. Consequently, a number of required database operations for a user release is substantially independent of a number of objects to be released. Rather, the number of required database operations is dependent only on a number of hierarchical levels. Client-side accesses to the server-side database can thus be reduced to a minimum. Besides a considerable acceleration of release processes (release duration in accordance with practical experiments shorter by a factor of 50-100), this results in a significant reduction in communication network loads.

In accordance with one preferred embodiment of the method in accordance with the invention, only the objects predefined by the user selection are loaded in a read and write manner for processing from the database into the at least one processing memory area. In addition, new objects are generatable in the processing memory area. Furthermore, respective level information is preferably assigned to processing memory areas, where the level information assigned to a selected processing memory area differs from the level information assigned to a processing memory area directly of higher priority by exactly one step. Accordingly, a first object in a processing memory area directly of higher priority, where the first object has an identical object identifier to a second object in a processing memory area of lower priority and a corresponding access-authorized user, in accordance with one preferred embodiment of the present invention, is a direct predecessor of the second object.

In accordance with one advantageous embodiment of the method of the invention, objects that have been loaded into a processing memory area are represented on a client-side graphical user interface in a superimposed manner with respect to objects stored in the database. Furthermore, objects that have been loaded into a processing memory area of lower priority are advantageously represented on the client-side graphical user interface in a superimposed manner with respect to objects that have been loaded into a processing memory area of higher priority. Processing memory areas are preferably made available for a client-side access in each case on the server side.

The control program in accordance with the invention for operating an engineering system for an industrial process automation system is stored on a non-transitory readable medium and is loadable into a main memory of a computer including a processor and comprises at least one code section upon whose execution the above-described steps a performed when the control program is executed on the computer.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below on the basis of an exemplary embodiment with reference to the drawing, in which.

DETAILED DESCRIPTION OF THE EXEMPLARY EMBODIMENTS

By creating processing memory areas (referred to hereinafter as working layers) of an engineering system for an industrial process automation system, it is possible for engineering data and installation objects to be processed in parallel by a plurality of users. Within the engineering system, components of the industrial process automation system are each represented by an engineering object as a computer-based object and stored in a persistent manner in at least one server-side database of the engineering system. The engineering objects are managed on the server side within a hierarchical object structure having a plurality of hierarchical levels. Here, the object structure comprises dependencies between objects.

During processing of engineering objects in working layers, an original database of a technical installation remains unchanged for the time being. It is only after processing that changes made to the engineering objects are consolidated in the context of a release process with the original database and are released into an operatively used stock of productive data of the installation.

Engineering objects predefined by a user selection are loaded in read and write manner for processing from the server-side database of the engineering system into at least one working layer. In this case, the engineering objects and the working layer are respectively assigned exactly one access-authorized user or owner. In addition to the engineering objects loaded from the database, new engineering objects are generatable in a working layer.

Working layers can have hierarchical dependencies with respect to other working layers. Here, a first working layer, which is assigned as owner to a second working layer, is hierarchically of higher priority with respect to the second working layer. Accordingly, a first engineering object in a working layer of higher priority, where the first engineering object has an identical object identifier to a second engineering object in a working layer of lower priority, is a predecessor of the second engineering object. In the present exemplary embodiment, respective level information is assigned to the working layers. The level information assigned to a selected working layer differs from the level information assigned to a working layer directly of higher priority by exactly one step. A first engineering object in a working layer directly of higher priority, where the first engineering object has an identical object identifier that is identical to a second engineering object in a working layer of lower priority and the same owner, is a direct predecessor of the second engineering object.

Figure 1:
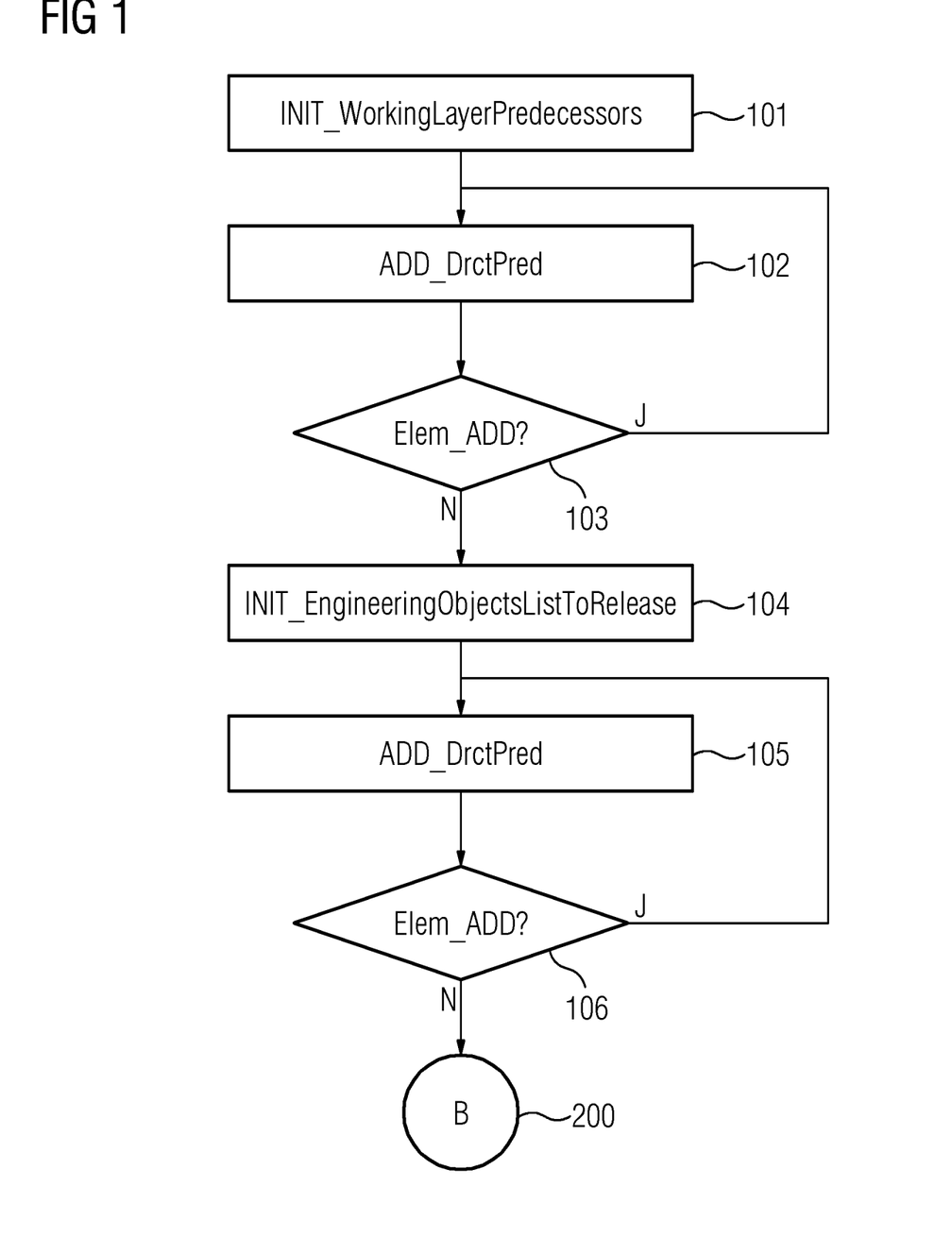
FIG. 1 shows a first part of a flow diagram for a method for the release of engineering objects processed in processing memory areas of an engineering system in accordance with the invention.
Figure 3:
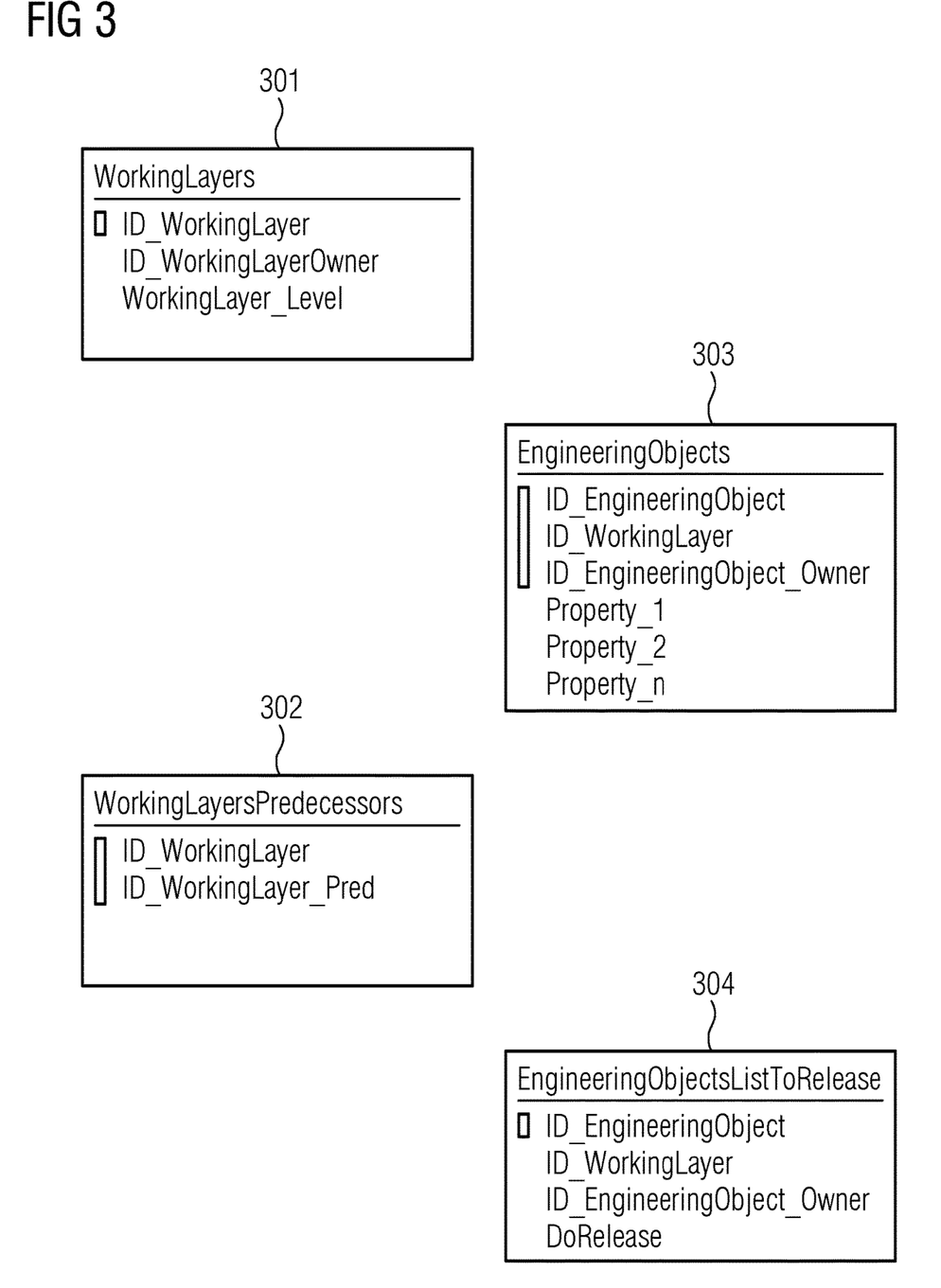
FIG. 3 shows a structural representation of temporary tables used for the release, in accordance with the invention.

Upon client-side initiation of a release process of engineering objects to be released that have been loaded into a selected working layer, in accordance with step 101 of the flow diagram illustrated in FIG. 1 for determining working layers of higher priority, a table WorkingLayerPredecessors is initialized, which comprises assignments between working layer identifiers of working layers and working layer identifiers of working layers of higher priority. FIG. 3 illustrates the table WorkingLayerPredecessors 302 with its attributes ID_WorkingLayer for the working layer identifiers and ID_WorkingLayer_Pred for the working layer identifiers of working layers of higher priority. In this case, both attributes ID_WorkingLayer and ID_WorkingLayer_Pred together form a primary key for the table WorkingLayerPredecessors 302.

The table WorkingLayerPredecessors 302 is initialized with information from a table WorkingLayers 301, which comprises assignments between working layer identifiers and owner identifiers for owners of the respective working layer. For this purpose, the table WorkingLayers 301 has (as attributes) ID_WorkingLayer for the working layer identifiers and ID_WorkingLayerOwner for the owner identifiers. In addition, the table WorkingLayers 301 comprises (as attribute) WorkingLayer_Level for level information assigned to the working layers. The attribute ID_WorkingLayer forms a primary key for the table WorkingLayers 301.

Firstly, the table WorkingLayerPredecessors 302 is filled with information about direct working layer owners from the table WorkingLayers 301. Here, it may happen that initially other working layers, but not users in the actual sense, are determined as working layer owners. An initialization of the table WorkingLayerPredecessors 302 can be realized, for example, via the following SQL statements.

```
DELETE FROM [WorkingLayersPredecessors]
INSERT INTO [WorkingLayersPredecessors]
SELECT [ID_WorkingLayer], [ID_WorkingLayer_Owner] FROM [WorkingLayers]
```

In accordance with steps 102 and 103, the table WorkingLayerPredecessors 302 is filled recursively until all working layers of higher priority have been determined, such that complete owner chains are derivable therefrom. Such a recursive filling of the table Working-LayerPredecessors 302 can be realized, for example, via the following SQL statements.

```
INSERT INTO [WorkingLayersPredecessors]
SELECT       DISTINCT         [PRED1].[ID_WorkingLayer],
[PRED2].[ID_WorkingLayer_Pred]
FROM [WorkingLayersPredecessors] [PRED1]
INNER JOIN [WorkingLayersPredecessors] [PRED2]
ON [PRED1].[ID_WorkingLayer_Pred] = [PRED2].[ID_WorkingLayer]
WHERE NOT EXISTS
```

```
(
SELECT 1 FROM [WorkingLayersPredecessors] [PRED3]
WHERE [PRED3].[ID_WorkingLayer] = [PRED1].[ID_WorkingLayer]
AND [PRED3].[ID_WorkingLayer_Pred] = [PRED2].[ID_WorkingLayer_Pred]
)
AND [PRED2].[ID_WorkingLayer_Pred] IS NOT NULL
```

Consequently, upon client-side initiation of a release process of engineering objects to be released that have been loaded into a selected working layer, a check can be performed to establish whether a working layer directly of higher priority is assigned to the selected working layer. In the event of a negative result of the check, i.e., if no working layer directly of higher priority is present, the objects to be released that have been loaded into the selected working layer are written back to the server-side database. By contrast, for releasable engineering objects that have been loaded into the selected working layer, in the event of a positive result of the check, direct predecessors of the releasable engineering objects in the working layer of higher priority are determined, which have the same owner as the releasable engineering objects. In accordance with step 104 of the flow diagram illustrated in FIG. 1, for this purpose firstly a table EngineeringObjectsListToRelease is initialized, which comprises all releasable engineering objects of the selected working layer and also a complete owner chain of the releasable engineering objects from the viewpoint of the selected working layer. This table comprises, in particular, assignments between engineering object identifiers, working layer identifiers and owner identifiers that are assigned to the respective releasable engineering object.

In accordance with FIG. 3, the table EngineeringObjectsListToRelease 304 has (as attributes) ID_EngineeringObject for the engineering object identifiers, ID_WorkingLayer for the working layer identifiers and ID_EngineeringObject_Owner for the owner identifiers. In addition, the table EngineeringObjectsListToRelease 304 comprises (as attribute) DoRelease for tagging engineering objects provided for a release. The attribute ID_EngineeringObject forms a primary key for the table EngineeringObjectsListToRelease 304.

The table EngineeringObjectsListToRelease 304 is firstly initialized with all references to entities of the engineering objects of the selected working layer, the identifier of which in the present exemplary embodiment is @ID_WorkingLayer-ToRelease. The entities of the engineering objects are managed in a table EngineeringObjects 303, which comprises (as attributes) ID_EngineeringObject for the engineering object identifiers, ID_WorkingLayer for the working layer identifiers and ID_EngineeringObject_Owner for the owner identifiers of the engineering objects. In addition, the table EngineeringObjects 303 comprises one or more attributes Property_1, Property_2, . . . , Property_n for defining specific properties of the respective engineering object. An initialization of the table EngineeringObjectsListToRelease 304 can be realized, for example, via the following SQL statements.

```
DELETE FROM [EngineeringObjectsListToRelease]
INSERT INTO [EngineeringObjectsListToRelease]
SELECT          [ID_EngineeringObject],          [ID_WorkingLayer],
[ID_Engineeringobject_Owner], 0
FROM [EngineeringObjects]
WHERE [ID_WorkingLayer] = @ID_WorkingLayerToRelease
```

In accordance with steps 105 and 106, the table EngineeringObjectsListToRelease 304 is filled recursively until all predecessors for the releasable engineering objects that have been loaded into the selected working layer have been determined. For this purpose, with respect to the originally releasable engineering objects and also with respect to the owners assigned to these engineering objects, entities of further engineering objects are determined in the owner chain and entered into the table EngineeringObjectsListToRelease 304. With the aid of the table WorkingLayersPredecessors 302, all entities that cannot be assigned to a working layer in the owner chain of the selected working layer are initially excluded. Of the remaining entities, that entity closest to the selected working layer or contained therein is determined with the aid of the table WorkingLayers 301. In principle, this is in each case the entity having the highest value of the assigned level information, which is mapped by the attribute WorkingLayer_Level in the table WorkingLayers 301. Finally, the entity identified in this way is added to the list of releasable engineering objects. A recursive filling of the table EngineeringObjectsListToRelease 304 can be realized for example by means of the following complex SQL statements.

```
INSERT INTO [EngineeringObjectsListToRelease]
SELECT DISTINCT
[T1].[ID_EngineeringObject],          [T1].[ID_WorkingLayer],
[T1].[ID_EngineeringObject_Owner], 0
FROM
(
SELECT          [EngineeringObjects].[ID_EngineeringObject],
[EngineeringObjects].[ID_WorkingLayer],
[EngineeringObjects].[ID_EngineeringObject_Owner]
FROM [EngineeringObjectsListToRelease]
INNER JOIN [EngineeringObjects]
ON    [EngineeringObjectsListToRelease].[ID_EngineeringObject Owner]    =
[EngineeringObjects].[ID_EngineeringObject]
) T1
INNER JOIN
```

```
(
SELECT              [EngineeringObjects].[ID_EngineeringObject],
MAX([WorkingLayers].[WorkingLayer_Level]) AS [WorkingLayer_Level]
FROM [EngineeringObjectsListToRelease]
INNER JOIN [EngineeringObjects]
ON      [EngineeringObjectsListToRelease].[ID_EngineeringObject_Owner]   =
[EngineeringObjects].[ID_EngineeringObject]
INNER JOIN [WorkingLayersPredecessors]
ON            [EngineeringObjects].[ID_WorkingLayer]                     =
[WorkingLayersPredecessors].[ID_WorkingLayer_Pred]
INNER JOIN [WorkingLayers]
ON          [WorkingLayersPredecessors].[ID_WorkingLayer Pred]           =
[WorkingLayers].[ID_WorkingLayer]
GROUP BY [EngineeringObjects].[ID_EngineeringObject]
) T2
ON [T1].[ID_EngineeringObject] = [T2].[ID_EngineeringObject]
WHERE EXISTS
(
SELECT 1 FROM [WorkingLayersPredecessors]
INNER JOIN [WorkingLayers]
ON          [WorkingLayersPredecessors].[ID_WorkingLayer Pred]           =
[WorkingLayers].[ID_WorkingLayer]
WHERE       [WorkingLayersPredecessors].[ID_WorkingLayer]                =
@ID_WorkingLayer_ToRelease                                               AND
[WorkingLayersPredecessors].[ID_WorkingLayer_Pred] = [T1].[ID_WorkingLayer]
AND [WorkingLayers].[WorkingLayer_Level] = [T2].[WorkingLayer Level]
)
AND NOT EXISTS
(
SELECT 1 FROM [EngineeringObjectsListToRelease] [T3]
WHERE [T3].[ID_EngineeringObject] = [T1].[ID_EngineeringObject]
)
```

Figure 2:
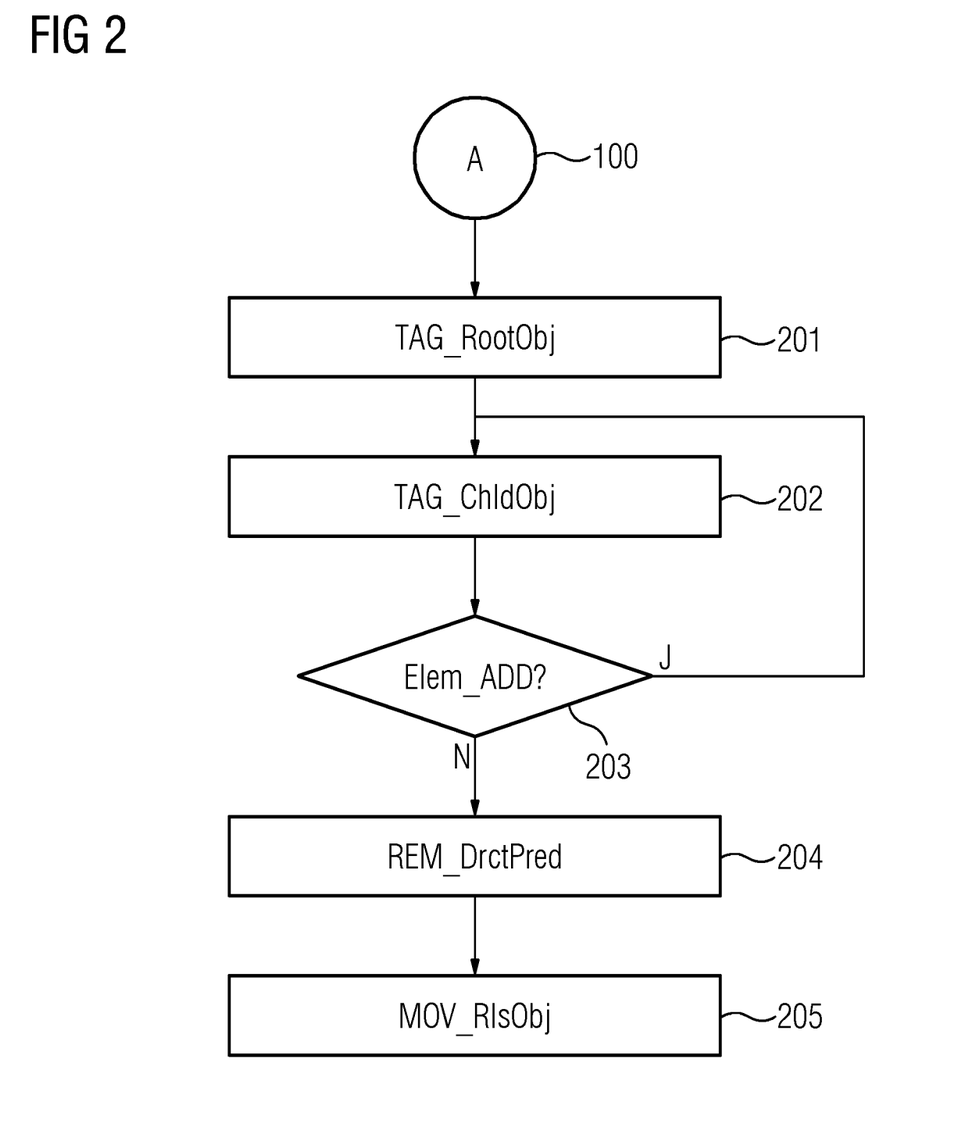
FIG. 2 shows a second part of the flow diagram of FIG. 1.

After the recursive filling of the table EngineeringObjectsListToRelease 304, in accordance with steps 105 and 106, a transition from the first part of the flow diagram illustrated in FIG. 1 to the second part of the flow diagram illustrated in FIG. 2 occurs via step 200 and step 100. In accordance with step 201, in the table EngineeringObjectsListToRelease 304, firstly, among the releasable engineering objects, the engineering objects to be released are tagged for release in accordance with user input. Roots of all partial trees that are intended to be the subject of a working layer release are defined in this way. In the present exemplary embodiment, the roots of the partial trees are identified by @ID_RootObject_1, @ID_RootObject_2, . . . , @ID_RootObject_n. A definition of the partial trees that are intended to be the subject of a working layer release can be realized, for example, via the following SQL statements.

```
UPDATE [EngineeringObjectsListToRelease]
SET [DoRelease] = 1
WHERE   [ID_EngineeringObject]   =   @ID_RootObject_1   AND
[ID_EngineeringObject] = @ID_Rootobject_2 AND
...
[ID_EngineeringObject] = @ID_Rootobject_n
```

Next, in accordance with steps 202 and 203, among the releasable engineering objects, engineering objects that are recursively subordinate to the engineering objects to be released within the hierarchical object structure are determined and tagged for release in the table EngineeringObjectsListToRelease 304. This can be realized for example by means of the following SQL statements.

```
UPDATE [T1]
SET [T1].[DoRelease] = [T2].[DoRelease]
FROM [EngineeringObjectsListToRelease] [T1]
INNER JOIN [EngineeringObjectsListToRelease] [T2]
ON     [T1].[ID_EngineeringObject_Owner]   =   [T2].[ID_EngineeringObject]   AND
[T1].[DoRelease] = 0 AND [T2].[DoRelease] = 1
```

Next, in accordance with step 204, engineering objects tagged for release are deleted from the working layer directly of higher priority so that they can be later replaced by the released engineering objects from the selected working layer. This can be realized, for example, via the following SQL statements.

```
DELETE FROM [EngineeringObjects]
FROM [EngineeringObjects]
INNER JOIN [EngineeringObjectsListToRelease]
ON            [EngineeringObjects].[ID_EngineeringObject]                =
[EngineeringObjectsListToRelease].[ID_EngineeringObject]
INNER JOIN [WorkingLayers]
ON            [EngineeringObjects].[ID_WorkingLayer]                     =
[WorkingLayers].[ID_WorkingLayer_Owner]
WHERE
[EngineeringObjectsListToRelease].[ID_WorkingLayer]                      =
@ID_WorkingLayer_ToRelease AND
[EngineeringObjectsListToRelease].[DoRelease] = 1 AND
[WorkingLayers].[ID_WorkingLayer] = @ID_WorkingLayer_ToRelease
```

Finally, in accordance with step 205, the engineering objects tagged for release, via a change of their assignment, are shifted from the selected working layer into the working layer directly of higher priority for a conclusion of the release process. This can be realized, for example, via the following SQL statements.

```
UPDATE [EngineeringObjects]
SET         [EngineeringObjects].[ID_WorkingLayer]      =
[WorkingLayers].[ID_WorkingLayer_Owner]
FROM [EngineeringObjects]
INNER JOIN [EngineeringObjectsListToRelease]
ON          [EngineeringObjects].ID_EngineeringObject   =
[EngineeringObjectsListToRelease].[ID_EngineeringObject] AND
[EngineeringObjects].[ID_WorkingLayer]                  =
[EngineeringObjectsListToRelease].[ID_WorkingLayer]
INNER JOIN [WorkingLayers]
ON [WorkingLayers].[ID_WorkingLayer] = @ID_WorkingLayer_ToRelease
WHERE       [EngineeringObjectsListToRelease].[ID_WorkingLayer] =
@ID_WorkingLayer_ToRelease AND
[EngineeringObjectsListToRelease].[DoRelease] = 1
```

In accordance with the present exemplary embodiment, the engineering objects tagged for release are thus deleted from the working layer directly of higher priority via a single database operation and are shifted from the selected working layer into the working layer directly of higher priority via a single database operation. Preferably, successors of the released engineering objects in working layers of lower priority, in the context of a release process, are replaced in accordance with the released engineering objects.

Figure 4:
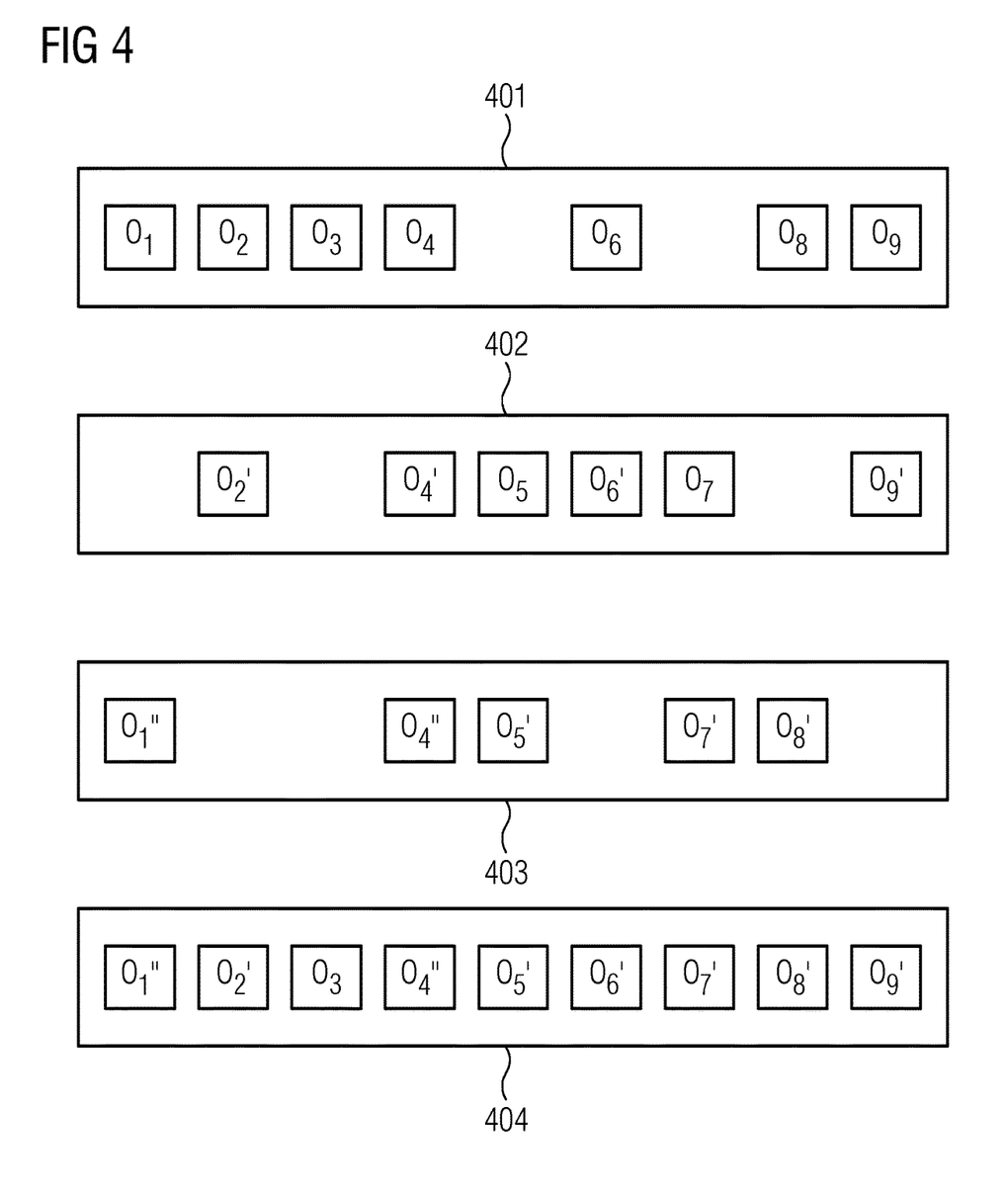
FIG. 4 shows a schematic illustration of a superimposition of processing memory areas on a graphical user interface.

In accordance with the superimposition of working layers 402, 403 on a graphical user interface 404 as illustrated schematically in FIG. 4, firstly, engineering objects $O_1''$, $O_4''$, $O_5'$, $O_7'$, $O_8'$ that have been loaded into a selected working layer 403 are represented in a superimposed manner with respect to the stock of productive data $O_1$-$O_4$, $O_6$, $O_8$-$O_9$ stored in the server-side database. Secondly, the engineering objects $O_1''$, $O_4''$, $O_5'$, $O_7'$, $O_8'$ are represented in a superimposed manner with respect to engineering objects $O_2'$, $O_4'$, $O_5$, $O_6'$, $O_7$, $O_9'$ that have been loaded into a working layer 402 of higher priority. In accordance with the example illustrated in FIG. 4, as a result the engineering objects $O_1''$, $O_2'$, $O_3$, $O_4''$, $O_5'$, $O_6'$, $O_7'$, $O_8'$, $O_9'$ are visible on the graphical user interface 404.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an engineering system for an industrial process automation system, the comprising:

representing each component of the industrial process automation system by a computer-based object within the engineering system and storing each represented component of the industrial process automation system in a persistent manner in at least one server-side database of the engineering system;

managing objects on a server side within a hierarchical object structure with a plurality of hierarchical levels, the hierarchical object structure comprising dependencies between objects;

loading objects predefined by a user selection for a processing from the at least one server-side database into at least one processing memory area, a respective access-authorized user being assigned to the objects and to the at least one processing memory area, a first processing memory area, which is assigned as an access-authorized user to a second processing memory area, being hierarchically of higher priority with respect to the second processing memory area, a first object in the first processing memory area of higher priority, said first object having an object identifier which is identical to a second object in a processing memory area of lower priority, being a predecessor of the second object;

performing a check to establish whether a processing memory area which is directly of higher priority is assigned to the selected processing memory area upon initiation of a client-side user release of objects to be released that have been loaded into a selected processing memory area;

writing objects to be released that have been loaded into the selected processing memory area back to the at least one server-side database in an event of a negative result of the check;

determining direct predecessors of releasable objects in the processing memory area of higher priority, which have access-authorized users corresponding to those of the releasable objects for releasable objects that have been loaded into the selected processing memory area, in an event of a positive result of the check;

adding determined predecessors to the releasable objects;

tagging objects to be released among the releasable objects for release in accordance with user input;

determining and tagging objects subordinate to the objects to be released among the releasable objects within the hierarchical object structure for release;

deleting objects tagged for release from the user memory area of higher priority; and shifting the objects tagged for release, via a change of their assignment, from the selected user memory area into the user memory area of higher priority to conclude the client-side user release.

2. The method as claimed in claim 1, wherein only the objects predefined by the user selection are loaded in a reading and writing manner for a processing from the database into the at least one processing memory area; and wherein new objects are generatable in the processing memory area.

3. The method as claimed in claim 1, wherein respective level information is assigned to processing memory areas; and wherein the level information assigned to a selected processing memory area differs from the level information assigned to a processing memory area directly of higher priority by one step.

4. The method as claimed claim 2, wherein respective level information is assigned to processing memory areas; and wherein the level information assigned to a selected processing memory area differs from the level information assigned to a processing memory area directly of higher priority by one step.

5. The method as claimed in claim 3, wherein a first object in a processing memory area directly of higher priority, said first object having an identical object identifier to a second object in a processing memory area of lower priority and a corresponding access-authorized user, is a direct predecessor of the second object.

6. The method as claimed in any of claim 1, wherein access-authorized users assigned to at least one of objects and processing memory areas are owners of the respective object or processing memory area.

7. The method as claimed in claim 1, wherein objects that have been loaded into a processing memory area are represented on a client-side graphical user interface in a superimposed manner with respect to objects stored in the database.

8. The method as claimed in claim 7, wherein objects that have been loaded into a processing memory area of lower priority are represented on the client-side graphical user interface in a superimposed manner with respect to objects that have been loaded into a processing memory area of higher priority.

9. The method as claimed in claim 7, wherein processing memory areas are each made available for a client-side access on the server side.

10. The method as claimed in claim 8, wherein processing memory areas are each made available for a client-side access on the server side.

11. The method as claimed in claim 1, wherein processing memory areas of higher priority are determined recursively for the selected processing memory area upon initiation of the client-side user release.

12. The method as claimed in claim 1, wherein the predecessors for the releasable objects that have been loaded into the selected processing memory area are determined recursively.

13. The method as claimed in claim 1, wherein the objects subordinate to the objects to be released within the hierarchical object structure are determined recursively.

14. The method as claimed in claim 11, wherein the objects tagged for release are deleted from the user memory area of higher priority by means of a single database operation, and wherein the objects tagged for release are shifted from the selected user memory area into the user memory area of higher priority via a single database operation.

15. The method as claimed in claim 1, wherein successors of objects released by a client-side user release in user memory areas of lower priority are replaced in accordance with the client-side user release.

16. A non-transitory computer readable medium encoded with a control program for operating an engineering system for an industrial process automation system, the control program being loadable into a main memory of a computer and comprising at least one code section upon whose execution when the control program is executed in the computer:
  components of the industrial process automation system are each represented by a computer-based object within the engineering system and stored in a persistent manner in at least one server-side database of the engineering system;
  the objects on the server side are managed within a hierarchical object structure with a plurality of hierarchical levels, the object structure comprising dependencies between objects;
  objects predefined by a user selection are loaded for a processing from the database into at least one processing memory area, a respective access-authorized user being assigned to the objects and to the processing memory area, a first processing memory area, which is assigned as access-authorized user to a second processing memory area, being hierarchically of higher priority with respect to the second processing memory area, and a first object in a processing memory area of higher priority, said first object having an identical object identifier to a second object in a processing memory area of lower priority, being a predecessor of the second object;
  upon initiation of a client-side user release of objects to be released that have been loaded into a selected processing memory area, a check is performed to establish whether a processing memory area which is directly of higher priority is assigned to the selected processing memory area;
  the objects to be released that have been loaded into the selected processing memory area are written back to the server-side database in the event of a negative result of the check;
  direct predecessors of the releasable objects in the processing memory area of higher priority are determined, which have access-authorized users corresponding to those of the releasable objects for releasable objects that have been loaded into the selected processing memory area in the event of a positive result of the check;
  the determined predecessors are added to the releasable objects;
  the objects to be released among the releasable objects are tagged for release in accordance with user input;
  objects subordinate to the objects to be released among the releasable objects within the hierarchical object structure are determined and tagged for release;
  objects tagged for release are deleted from the user memory area of higher priority; and the objects tagged for release, via a change of their assignment, are shifted from the selected user memory area into the user memory area of higher priority to a conclude the client-side user release.

* * * * *